(12) United States Patent
Coenen et al.

(10) Patent No.: US 12,736,109 B2
(45) Date of Patent: Sep. 15, 2026

(54) THREE SPEED ELECTRIC VEHICLE TRANSMISSION

(71) Applicant: DANA BELGIUM, Bruges (BE)

(72) Inventors: Pauwel Coenen, Aalter (BE); Filip D. Schacht, Meulebeke (BE); Kurt Cattoor, Koolkerke (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/957,171

(22) Filed: Nov. 22, 2024

(65) Prior Publication Data

US 2025/0198484 A1 Jun. 19, 2025

Related U.S. Application Data

(60) Provisional application No. 63/609,497, filed on Dec. 13, 2023.

(51) Int. Cl.
*B60K 1/02* (2006.01)
*B60K 17/08* (2006.01)
*F16H 3/091* (2006.01)

(52) U.S. Cl.
CPC ............... *F16H 3/091* (2013.01); *B60K 1/02* (2013.01); *B60K 17/08* (2013.01); *F16H 2200/0021* (2013.01); *F16H 2200/0039* (2013.01)

(58) Field of Classification Search
CPC ............. F16H 3/091; F16H 2200/0021; F16H 2200/0039; B60K 1/02; B60K 17/08
See application file for complete search history.

(56) References Cited

U.S. PATENT DOCUMENTS

2021/0379978 A1 12/2021 Van Dingenen et al.

FOREIGN PATENT DOCUMENTS

| | | | | |
|---|---|---|---|---|
| CN | 107747613 B * | 1/2020 | ............... | F16H 3/12 |
| DE | 19932118 C1 * | 10/2000 | ............ | B60K 17/04 |
| DE | 102011084623 A1 | 4/2013 | | |
| WO | WO-2019082256 A1 * | 5/2019 | .......... | B60K 17/344 |
| WO | 2020078596 A1 | 4/2020 | | |

OTHER PUBLICATIONS

Rinaldi, P. et al., “System and Method for Shifting in a Dual Motor Transmission,” U.S. Appl. No. 18/450,951, filed Aug. 16, 2023, 39 pages.
Schacht, F. et al., “Systems and Method for an Electric Powertrain,” U.S. Appl. No. 18/629,784, filed Apr. 8, 2024, 20 pages.

* cited by examiner

*Primary Examiner* — William C Joyce
(74) *Attorney, Agent, or Firm* — McCoy Russell LLP

(57) ABSTRACT

Systems and methods are herein provided for a three-speed electric transmission system. In one example, a transmission system comprises a first electric motor coupled to an input speed reduction gear train, wherein the input speed reduction gear train rotationally couples to an input shaft; a second electric motor coupled to the input speed reduction gear train; a first clutch positioned on the input shaft; a second clutch positioned on the input shaft; a synchronizer positioned on a synchronizer shaft, wherein the synchronizer shaft is rotationally coupled to the input shaft; an idler shaft rotationally coupled to the synchronizer shaft; and an output shaft rotationally coupled to the idler shaft, wherein the output shaft is in one of a first position and a second position.

20 Claims, 8 Drawing Sheets

| | First Clutch | Second Clutch | Synchronizer |
|---|---|---|---|
| First Gear Ratio | Engaged | Disengaged | First position |
| Second Gear Ratio | Disengaged | Engaged | Bypassed |
| Third Gear Ratio | Engaged | Disengaged | Second position |

THREE SPEED ELECTRIC VEHICLE TRANSMISSION

CROSS REFERENCE TO RELATED APPLICATIONS

The present application claims priority to U.S. Provisional Application No. 63/609,497 entitled "THREE SPEED ELECTRIC VEHICLE TRANSMISSION", filed on Dec. 13, 2023. The entire contents of the above-listed application is hereby incorporated by reference for all purposes.

TECHNICAL FIELD

Embodiments of the subject matter disclosed herein relate to electric vehicles, and more specifically to electric vehicle transmission systems.

BACKGROUND AND SUMMARY

Electric vehicles make use of electric drive units to generate motive power and provide an attractive alternative in terms of hydrocarbon emissions in relation to vehicles that solely rely on internal combustion engines for propulsion. Electric drive units often comprise transmission that include a plurality of clutches, gears, and shafts to transfer mechanical power from one or more motors to downstream components. Further, dual-motor systems have been utilized in some electric drive units to increase the drive units' power output and control adaptability. Improving efficiency and optimizing functionality of a transmission design allows for better performance of vehicles, especially electric and hybrid vehicles, which employ the transmission. Thus, a transmission with greater versatility may achieve higher efficiency and improved function of a broader range of vehicle types.

Some examples of such electric drive units of electric vehicles include a dual-motor drive unit where the motors are arranged on the same side of the transmission as well as multiple gears or clutches positioned on an output shaft. Further, some transmission systems of electric drive units include countershaft layouts as opposed planetary systems. However, high input speeds from the motors may result in degradation to internal components such as clutches and gears. Further, different applications may have different packaging demands. For example, loader-type vehicles may demand transmissions with a long drop from a main section of the transmission to the output because the transmission is assembled within the loader vertically higher with respect to the axles than other types of vehicles. Other types of vehicles, such as on-highway vehicles, may demand a short drop from the main section the transmission to the output. Because of this, certain transmission system layouts may not be applicable to multiple vehicle applications.

The inventors herein have recognized several drawbacks to such electric drive units. For example, including multiple gears or clutches on the output shaft increases the width of the transmission which may pose barriers to integration in certain vehicle platforms. Further, certain drop configurations may be incompatible in certain vehicles that demand shorter or longer drops due to packaging demands of surrounding vehicle systems, such as the long drop demanded by loaders. Further, due to the layout of clutches and associated gear reductions on downstream shafts included in previous electric drive units, the unit's width may not meet packaging demands of some vehicles. Additionally, high input speeds from electric motors may result in degradation to transmission components.

The inventors herein have recognized the aforementioned issues and developed a transmission system in an electric drive unit that at least partially addresses these issues. The electric drive unit, in one example, includes two electric motors and a transmission. The transmission may be a three speed electric transmission that comprises a plurality of clutches, a plurality of gears, and a plurality of shafts. In a first embodiment, the transmission system comprises a first clutch, a second clutch, and a synchronizer, wherein the first and second clutches are configured as a multi-range clutch positioned on an input shaft and the synchronizer is arranged on a different shaft. The first clutch, when engaged, may transfer power through the synchronizer, which may be in a first position in a first gear ratio or a second position for a third gear ratio. The second clutch, when engaged, may transfer power to the output, bypassing the synchronizer, for a second gear ratio.

The transmission system allows for flexibility in an output shaft location. The output shaft may be arranged in a short drop configuration where an axis of an input shaft and an axis of the output shaft are close to aligning or long-drop configuration where the axis of the input shaft and the axis of the output shaft are distanced further apart. The flexibility allows for a choice between the two configurations depending on the application, whereby the transmission system may be configured with a long drop configuration for applications that demand distance between input and output, such as loaders, or with a short drop configuration for applications that demand less distance between input and output. In this way, a single transmission design may be used for several vehicle types, rather than several transmissions with each being more specific to a certain vehicle type. Hence, a single more versatile transmission may reduce cost and complexity of manufacturing compared to producing multiple more limited transmission designs.

Further, the transmission system herein described is designed with flexibility of torque to speed ratio may be able to adapt to a broader range of driving conditions, including both on- and off-road driving. For driving conditions which require high torque, relatively high input speed is generally required. However, a transmission design which reduces input speed requirements and therefore speeds of internal components within a gearbox may minimize stress on components of the gearbox, thereby preventing failure of the components and prolonging a lifetime of the transmission. Speed reduction may also reduce drag losses on wet clutches, therefore efficiency may be increased with such a transmission.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for a three-speed countershaft transmission for an electric vehicle comprising two electric motors. The transmission system includes a plurality of clutches, shafts, and gears. In particular, the transmission system includes an input shaft on which a second clutch is positioned, a first clutch shaft on which a first clutch is positioned, a second clutch shaft on which a third clutch is positioned, and an output shaft. In a first configuration, the output shaft is in a short drop arrangement position. In a second configuration, the output shaft is in a long drop arrangement position. The transmission system, in either configuration, provides for three speeds from three gear ratios and is configurable into either of the output shaft position embodiments based on vehicle platform demands.

Figure 1:
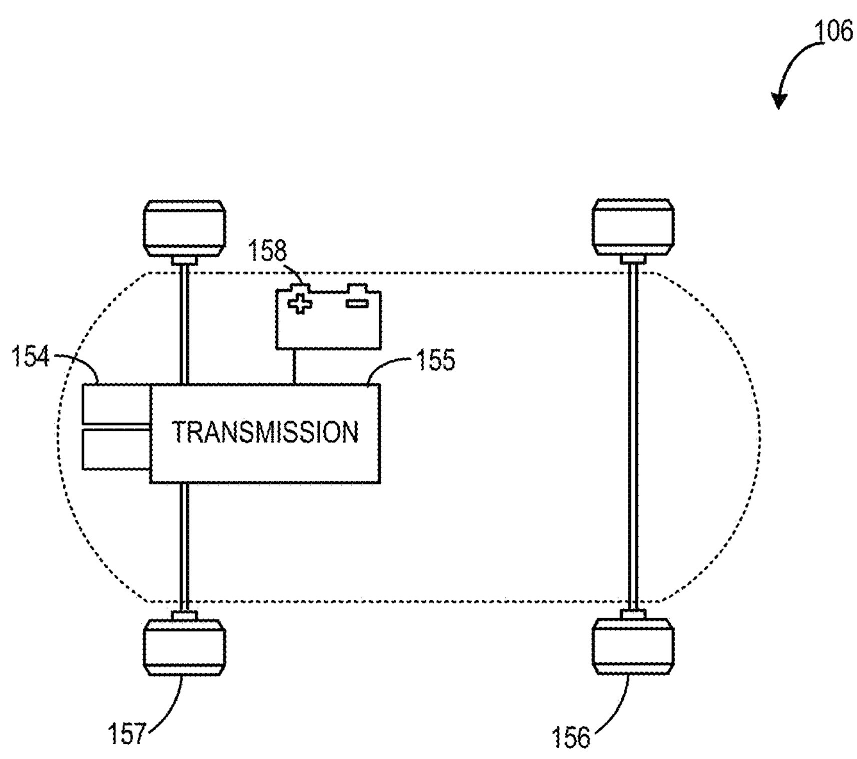
FIG. 1 shows a schematic of an exemplary vehicle.
Figure 1:
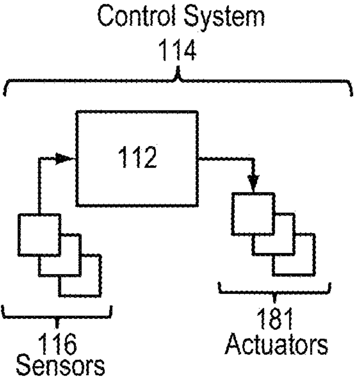
Figure 2:
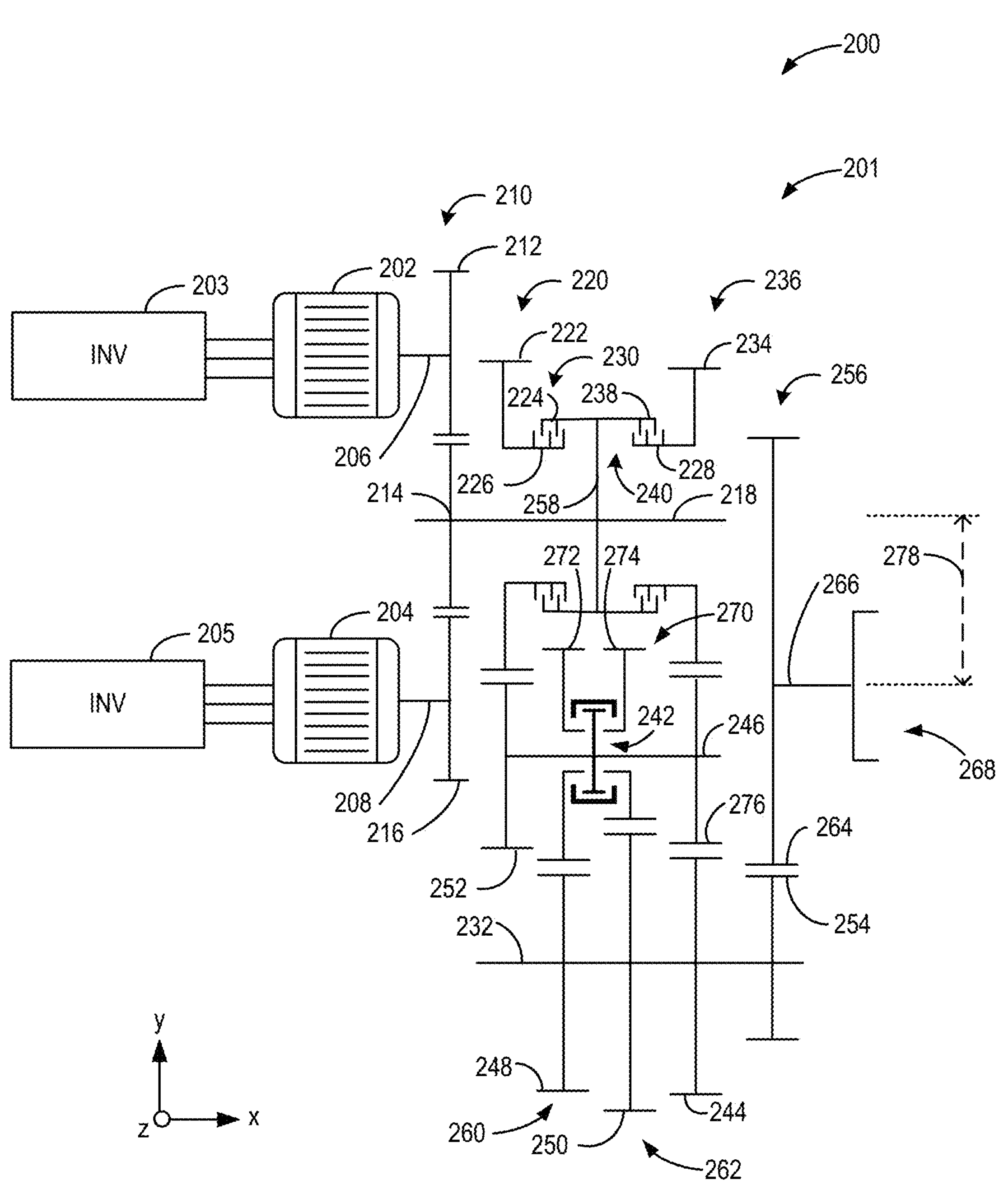
FIG. 2 shows a schematic of a three-speed transmission system according to a first embodiment with an output in first position.
Figure 3:
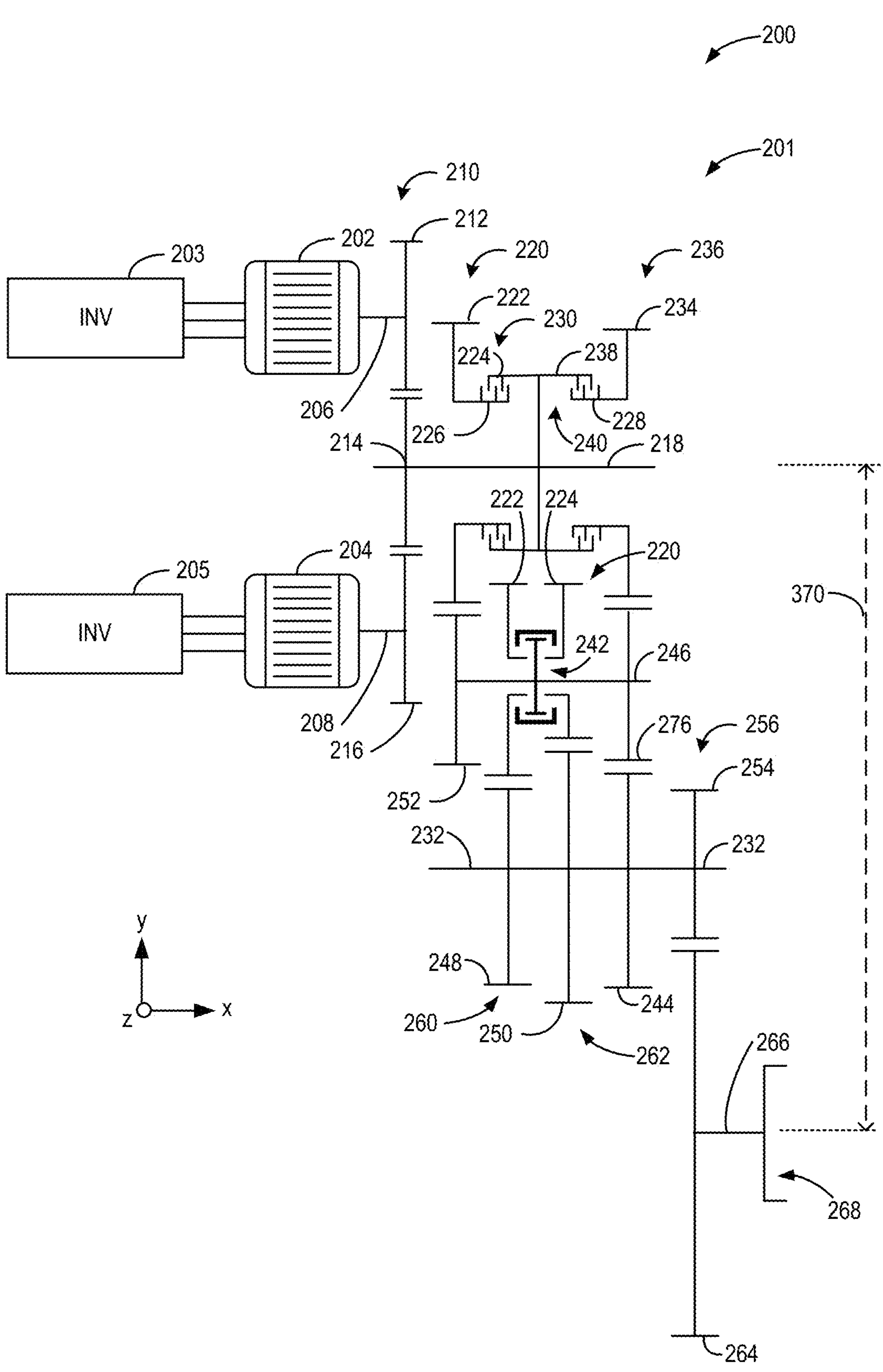
FIG. 3 shows a schematic of the three-speed transmission system according to the first embodiment with the output in a second position.
Figure 4A:
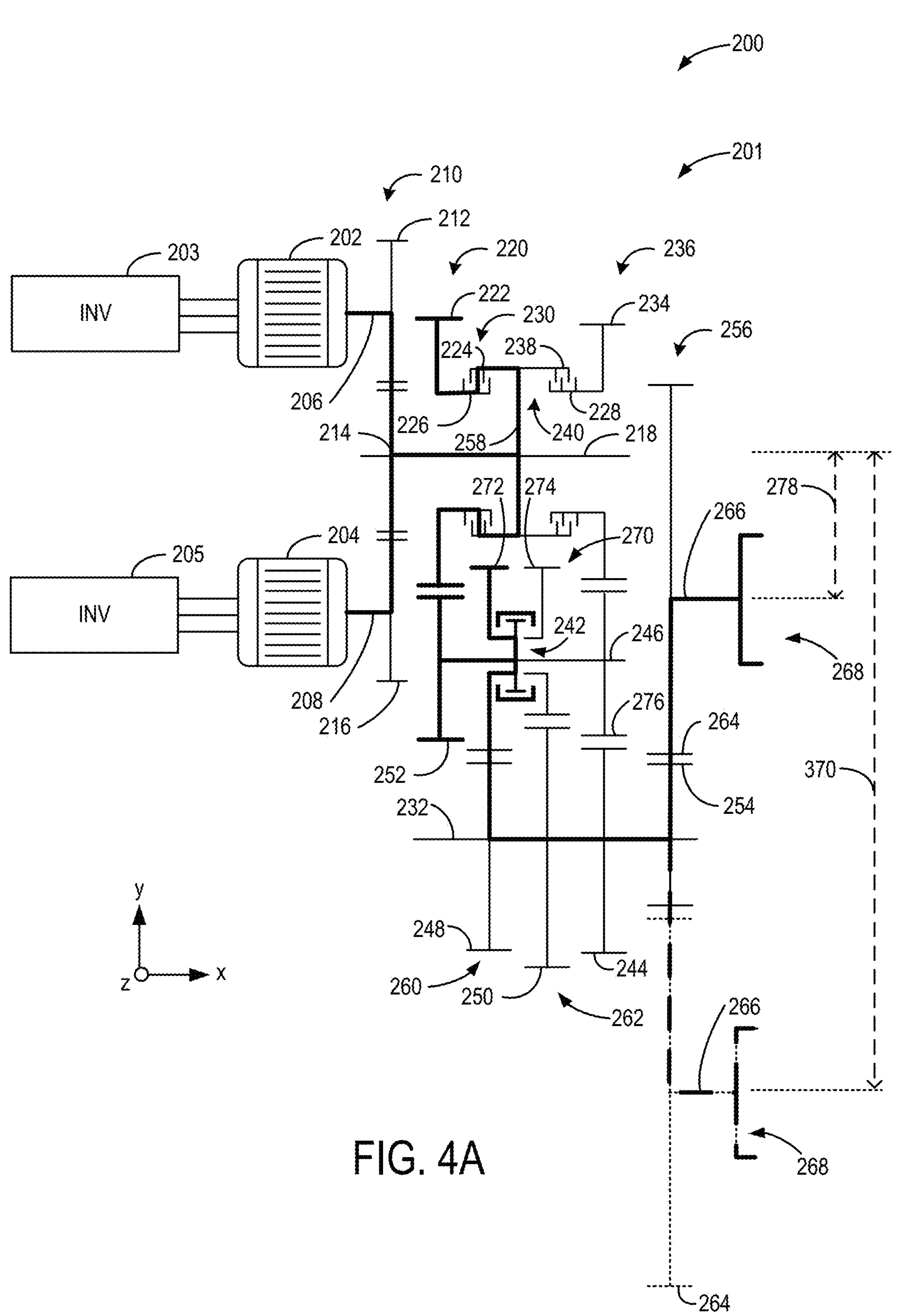
FIG. 4A shows a power path in the three-speed transmission system of FIG. 2 in a first operating gear ratio.
Figure 4B:
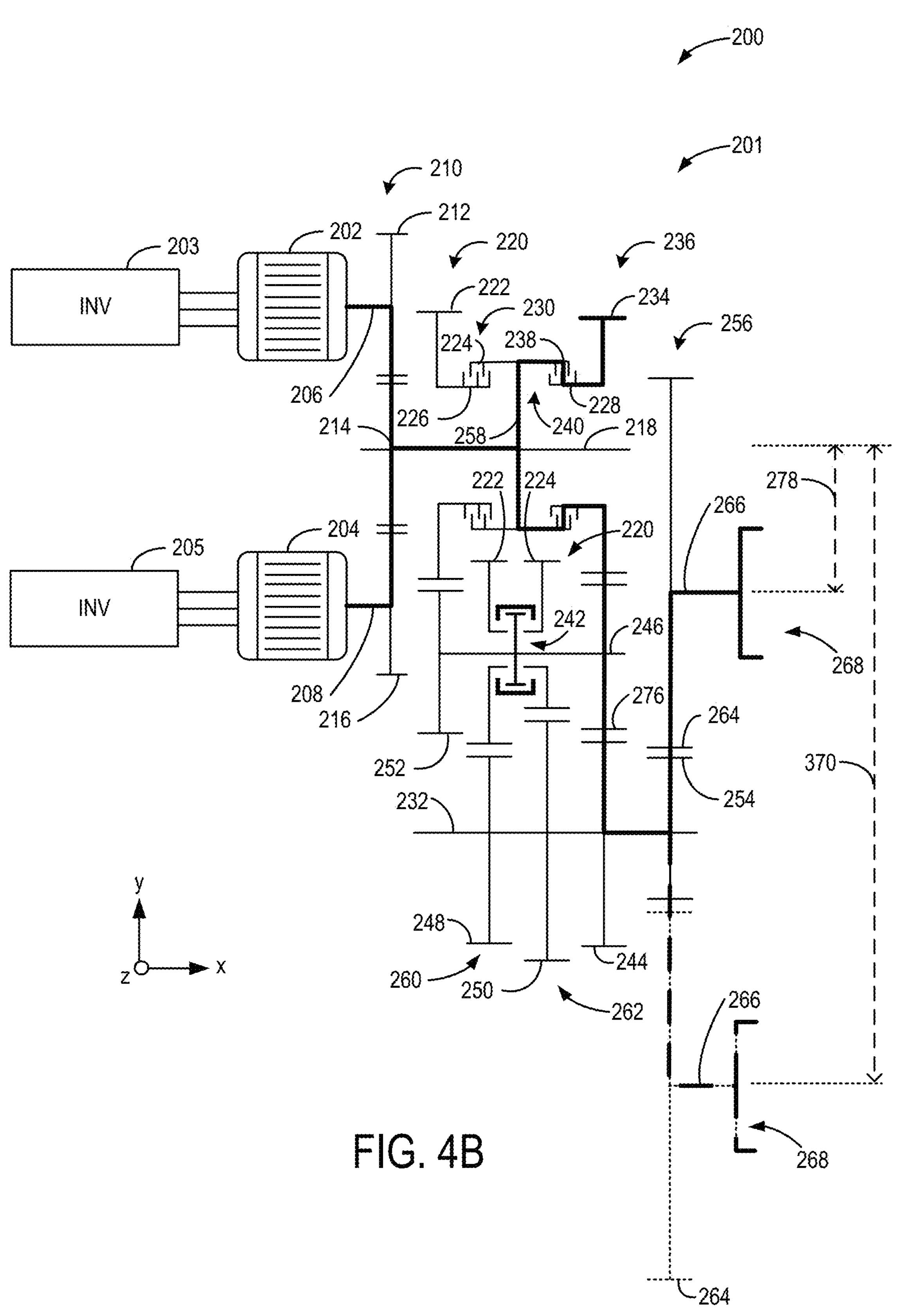
FIG. 4B shows a power path in the three-speed transmission system of FIG. 2 in a second operating gear ratio.
Figure 4C:
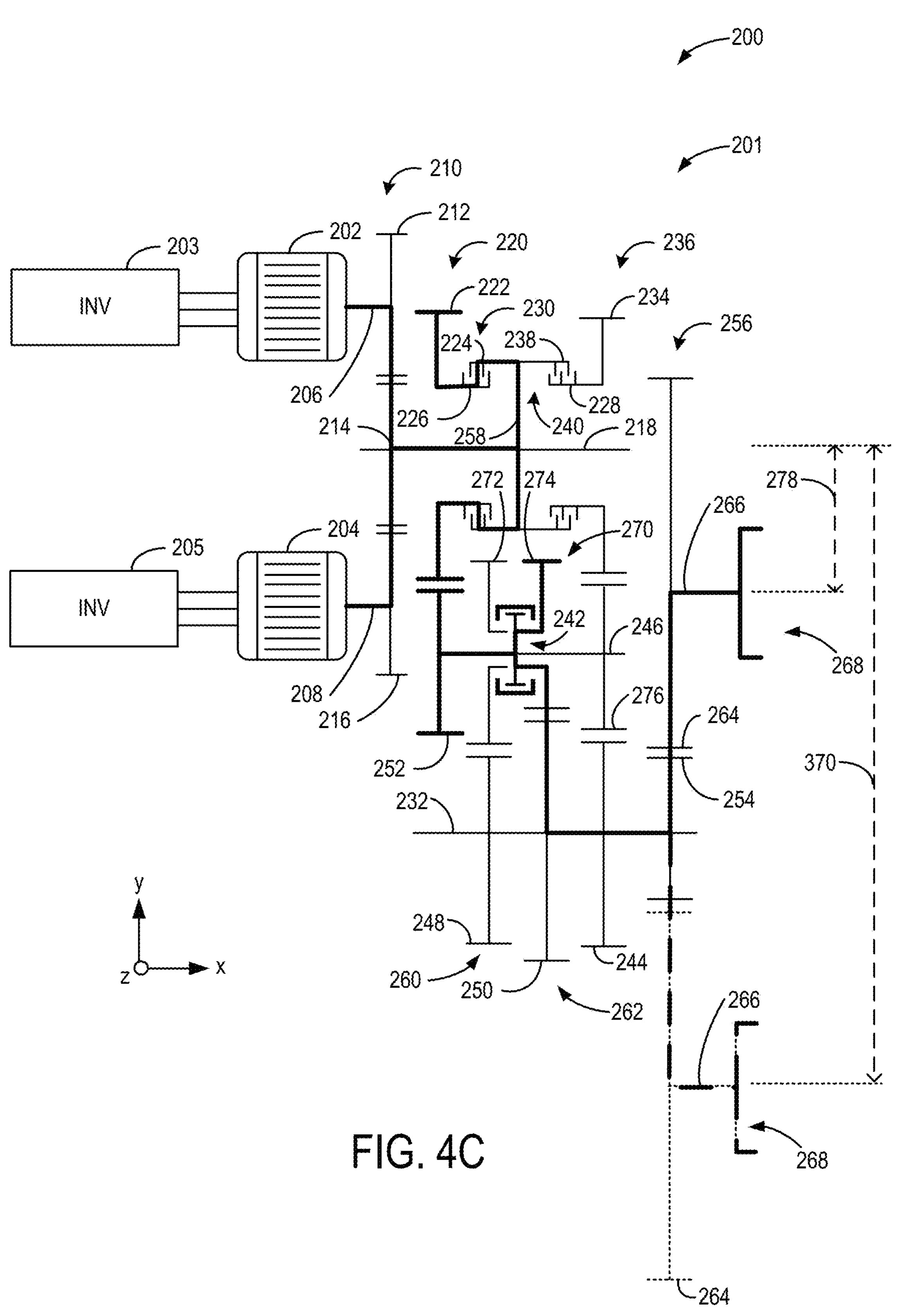
FIG. 4C shows a power path in the three-speed transmission system of FIG. 2 in a third operating gear ratio.

An exemplary electric vehicle is shown in FIG. 1. A first configuration of the layout of the transmission with the output shaft in a short drop arrangement is depicted in FIG. 2. A second configuration of the layout of the transmission with the output shaft in a long drop arrangement is depicted in FIG. 3. Power paths through the transmission system for a first, second, and third gear ratio are shown in FIGS. 4A, 4B, and 4C, respectively. A method of operation of the transmission system is shown in a flowchart in FIG. 5. Clutch engagements for the first, second, and third gear ratios are shown in a table in FIG. 6.

FIGS. 1-4C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face sharing contact with each other may be referred to as in face-sharing contact. As another example, elements positioned apart from each other with only a space there-between and no other components may be there-between may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

Turning now to the figures, FIG. 1 shows a schematic depiction of a vehicle system 106 that can derive propulsion power from one or more electric motors 154 (e.g., a drive motor). In some examples, the vehicle system 106 may be a front loader or compact wheel loader vehicle system. In one example, electric motors 154 may be traction motors. Electric motors 154 receive electrical power from a traction battery 158 to provide torque to rear vehicle wheels 157 via transmission 155. Electric motors 154 may also be operated as a generator to provide electrical power to charge traction battery 158, for example, during a braking operation. It should be appreciated that while FIG. 1 depicts electric motors 154 and transmission system 155 mounted in a rear wheel drive configuration, other configurations are possible, such as employing the electric motor 154 in a front wheel configuration, or in a configuration in which a first output yoke or other interface drives the rear vehicle wheels 157 and a second output yoke or other interface drives front vehicle wheels 156.

Electric motors 154 and transmission 155 may be included as part of an electric drive unit. In some examples, the electric motors 154 may be integrated with a gearbox of the transmission system 155. Additionally or alternatively, the electric motors 154 may be coupled to an outside of a transmission/gearbox housing. The transmission/gearbox may include at least one clutch and one or more shafts, as will be described below. Controller 112 may send a signal to an actuator of the clutch(es) to engage or disengage the clutch(es), so as to couple or decouple power transmission from the electric motors 154 to various shafts and gears therein.

Controller 112 may form a portion of a control system 114. Control system 114 is shown receiving information from a plurality of sensors 116 and sending control signals to a plurality of actuators 181. As one example, sensors 116 may include sensors such as a battery state of charge sensor, clutch pressure sensor, speed sensors, etc. As another example, the actuators may include the clutch(es), etc. The controller 112 may receive input data from the various sensors, process the input data, and trigger the actuators in response to the processed input data based on instruction or code programmed therein corresponding to one or more routines.

Turning now to FIGS. 2 and 3, a schematic layout of an exemplary electric transmission system 200 is shown. For reference, an axis system is provided in FIG. 2, as well as in FIGS. 3-4C. The y-axis may be a vertical axis (e.g., parallel to a gravitational axis), the x-axis may be a lateral axis (e.g., a horizontal axis), and/or the z-axis may be a longitudinal axis. However, the axes may have other orientations in other examples, for the y-axis may be a lateral axis and the x-axis may be a vertical axis. The transmission system 200 is shown in FIG. 2 with an output in a first position, according to the first configuration of the system herein disclosed. The transmission system 200 is shown in FIG. 3 with the output in a second position, according to the second configuration of the system herein disclosed. In some examples, the transmission system 200 herein described may be a single drum design. The components of the transmission system 200 are shared in the first and second configurations and thus will not be reintroduced in the description of FIG. 3, for brevity.

The electric transmission system 200 may comprise a first electric motor 202, a second electric motor 204, and a multi-speed transmission 201 (e.g., a three-speed transmission) and may therefore be a multi-speed (e.g., three-speed) transmission system. The transmission system 200 may comprise a plurality of clutches, including a first clutch 230, a second clutch 240, and a synchronizer 270, and a plurality of shafts, including an input shaft 218, a synchronizer shaft 246, an idler shaft 232, and an output shaft 266. The plurality of shafts are rotationally coupled via a plurality of gears, as will be herein described. The gears of the transmission system 200 may be conceptually partitioned into a plurality of gear trains, including a first gear train 210, a second gear train 220, a third gear train 260, a fourth gear train 262, a fifth gear train 236, and a sixth gear train 256.

The first and second electric motors 202, 204 may include conventional components such as rotors and stators that electromagnetically interact during operation to generate motive power. Further, in one example, the electric motors may be motor-generators which are designed to generate electrical energy during regenerative operation. Still further, the electric motors may have similar designs and sizes, in some instances. In this way, manufacturing efficiency may be increased. However, the electric motors may have differing sizes and/or designs in alternate examples.

Each of the first and second electric motors 202, 204 may be configured to provide a desired amount of tractive power for operation of the vehicle, such as vehicle 106, as well as a target top speed and speed on ramp. The use of multiple motors in the system therefore enables the system to attain end-use performance goals. Each of the first and second electric motors 202, 204 may be electrically coupled to one or more energy storage devices (e.g., one or more traction batteries, capacitor(s), fuel cells, combinations thereof, and the like) by way of first inverter 203 and second invertor 205, respectively. In one use-case example, the first and second electric motors 202, 204 and the respective first and second inverters 203, 205 may be three-phase devices. However, motors and inverters designed to operate using more than three phases have been envisioned.

The first electric motor 202 may comprise a first rotor shaft 206 that rotationally couples to the multi-speed transmission 201 for transfer of mechanical/rotational power from the first electric motor 202 into the multi-speed transmission 201. Similarly, the second electric motor 204 may comprise a second rotor shaft 208 that rotationally couples to the multi-speed transmission 201. Each of the first and second rotor shafts 206, 208 may be rotationally coupled to the first gear train 210. For example, the first rotor shaft 206 may rotationally couple to gear 212, which meshes with gear 214 and the second rotor shaft 208 may rotationally couple to gear 216, which also meshes with gear 214 at an opposite end from the gear 212. The first gear train 210 therefore comprises gears 212, 214, and 216 coupled in series. In the depicted example layout shown, the first electric motor 202 is arranged vertically above the second electric motor 204. However, it should be appreciated that alternative arrangements are possible without departing from the scope of this disclosure. For example, the first and second motors may be arranged along a shared horizontal axis and may be arranged vertically above the transmission 201.

The first and second electric motors 202, 204 may output a relatively high torque due to high input speeds. The first gear train 710 may be configured as an input speed reduction gear train. One embodiment of a method for an input speed reduction gear train is described. One or more drive input shafts (e.g., one or both of the first and second rotor shafts 206, 208) rotates at an input speed. When two shift elements of the input speed reduction gear train are engaged (for example, meshed), the output shaft of the reduction gear train (e.g., input shaft 218) rotates at an output speed. The output speed may be lower than the input speed, thus allowing for the input speed to be high without resulting in high output speeds. Reducing high input speeds through the transmission may mitigate degradation to components of the transmission system, such as clutches, gears, bearings, and the like. Reducing high input speeds may also reduce size of the gears of the system, thereby reducing an overall package size.

The gear 214 of the first gear train 210 may rotationally couple to input shaft 218. The input shaft 218 may further fixedly rotationally couple to gear 258. The gear 258 may fixedly couple to or otherwise be formed with the first and second clutches 230, 240. For example, the gear 258 may fixedly couple to or otherwise be formed with first clutch drum 224 of the first clutch 230 and with the second clutch drum 238 of the second clutch 240. For example, the first clutch drum 224 and the second clutch drum 238 may be welded to the gear 258. In this way, rotational power may be transferred through either the first or second clutch via the input shaft 218.

The first clutch drum 224 of the first clutch 230 may selectively engage with first clutch hub 226. The first clutch hub 226 may be fixedly coupled to or otherwise formed with first clutch gear 222. The first clutch gear 222 may mesh with gear 252, which is arranged on the synchronizer shaft 246. First clutch gear 222 and gear 252 may form the second gear train 220. Similarly, the second clutch drum 238 of the second clutch 240 may selectively engage with second clutch hub 228. The second clutch hub 228 may be fixedly coupled to or otherwise formed with second clutch gear 234. The second clutch gear 234 may mesh with gear 276 which is arranged on the synchronizer shaft 246. The gear 276 may further mesh with gear 244 that is arranged on (e.g., rotationally coupled to) the idler shaft 244. Second clutch gear 234, gear 276, and gear 244 may form fifth gear train 236.

The first and second clutches 230, 240 may be arranged on a shared gear (e.g., gear 258). In some examples, the first and second clutches 230, 240 may thus be a multi-range clutch in which the multi-range clutch is either in a first position (e.g., with the first clutch 230 engaged) or a second position (e.g., with the second clutch 240 engaged). In other examples, the multi-range clutch may also comprise a neutral position in which neither the first or second clutches 230, 240 are engaged.

As herein described, the input shaft 218 may be coupled to the synchronizer shaft 246 via one of the first clutch 230 and the second clutch 240. For example, when the first clutch 230 is engaged, the input shaft 218 may be rotationally coupled to the synchronizer shaft 240 via the first clutch 230 by way of the first clutch gear 222 and the gear 252 that are meshed. Similarly, when the second clutch 240 is engaged, the input shaft 218 may be rotationally coupled to the synchronizer shaft 240 via the second clutch 240 by way of the second clutch gear 234 and the gear 276 that are meshed.

As noted, the gear 252 and the gear 276 may both rotationally couple to synchronizer shaft 246. The synchronizer 270 may couple to the synchronizer shaft 246 as well. The synchronizer 270 may comprise a selector 242, a first synchronizer gear 272, and a second synchronizer gear 274. The selector 242 may be a selector fork, in some examples, and may enable movement of the synchronizer 270 to engage or disengage one or more gears of the idler shaft 232, such as gear 248 or gear 250, depending on a selected gear ratio. For example, the first synchronizer gear 272 may selectively engage gear 248 and the second synchronizer gear 274 may selectively engage gear 250. The first synchronizer gear 272 and gear 248 may together form the third gear train 260 and the second synchronizer gear 274 and gear 250 may together form the fourth gear train 262. Synchronizer movement may be based on input from various sensors of the control system of FIG. 1, and may include but are not limited to transmission range, vehicle speed, throttle pedal position, ambient temperature, steering angle, brake inputs, electric motor speed and torque (for both the first and second electric motors 202, 204), and transmission input shaft speed.

Gears 248 and 250 may both be positioned on (e.g., rotationally coupled to) the idler shaft 232 such that selective engagement of one of them from the synchronizer 270 transfers rotational power to the idler shaft 232 in different gear ratios. The second gear train 220 may be configured such that rotational power has to pass through the synchronizer 270 in either a first position or a second position in order to transfer power to the idler shaft 232 when the first clutch 230 is engaged. The first position of the synchronizer 270 may be with the first synchronizer gear 272 engaged with the gear 248, thereby defining a first gear ratio of the available three gear ratios. The second position of the synchronizer 270 may be with the second synchronizer gear 274 engaged with the gear 250, thereby defining a third gear ratio of the available three gear ratios. The fifth gear train 236 may be configured such that rotational power may bypass the synchronizer 270 via gears 276 and 244 to be transferred to the idler shaft 232 when the second clutch 240 is engaged, thus defining a second gear ratio of the available three gear ratios.

Thus, as herein described, the synchronizer shaft 246 may be rotationally coupled to the idler shaft 232 via the synchronizer 270, in one of its two positions, or the second clutch 240. For example, when the second clutch 240 is engaged, the fifth gear train 236 may couple the input shaft 218 to the synchronizer shaft 246 via the second clutch gear 234 and the gear 276 and may couple the synchronizer shaft 246 to the idler shaft 232 via the gear 276 and the gear 244. When the first clutch 230 is engaged and the synchronizer 270 is in the first position, the synchronizer shaft 246 may be coupled to the idler shaft 232 via the third gear train 260 (e.g., via the first synchronizer gear 272 and the gear 248). When the first clutch 230 is engaged and the synchronizer 270 is in the second position, the synchronizer shaft 246 may be rotationally coupled to the idler shaft 232 via the fourth gear train 262 (e.g., the second synchronizer gear 274 and the gear 250).

The synchronizer 270, in some examples, may only be in either the first or the second position. Thus, when the second clutch 240 is engaged, rotational power may bypass the synchronizer 270 even when in one of the first and second positions. In other examples, the synchronizer 270 may have a neutral position as well in which neither the gear 248 nor the gear 250 are engaged by a synchronizer gear. In this way, the transmission system 200 may have three available gear ratios with two clutches and the synchronizer.

Figure 6:
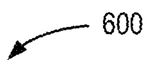
FIG. 6 shows a table of exemplary operational gear and clutch engagements of the three-speed transmission system according to the first and second embodiments.

Turning briefly to FIG. 6, available gear ratios and clutch engagements thereof are shown. FIG. 6 shows a table 600 of clutch engagements for gear ratios for both configurations of the transmission 200 herein described. In the first gear ratio, the first clutch (e.g., first clutch 230) is engaged and the synchronizer (e.g., synchronizer 270) is in the first position while the second clutch (e.g., second clutch 240) is disengaged. In the second gear ratio, the first clutch is disengaged, the second clutch is engaged, and the synchronizer is bypassed. As described above, in the second gear ratio the synchronizer may be in any available position (e.g., first position, second position, or a neutral position) as rotational power may bypass the synchronizer when the second clutch is engaged and the first clutch is disengaged. In the third gear ratio, the first clutch is engaged and the synchronizer is in the second position while the second clutch is disengaged.

Returning to FIG. 2, the idler shaft 232 may further rotationally couple to the sixth gear train 256 via gear 254. The sixth gear train 256 may comprise gear 254 and output gear 264. Gear 254 may mesh with output gear 264, which may rotationally couple to output shaft 266. The output shaft 266 may couple to one or more output interface 268. The one or more output interfaces may be designed to attach to axles (not shown) via shafts, couplings, combinations thereof, and/or the like. Such axles may include components such as differentials, axle shafts, and drive wheels (e.g., front vehicle wheels 156 and rear vehicle wheels 157 of FIG. 1). The output shaft 266 may thus be configured to transfer rotational torque to the axles. The output interfaces 268 may be flanges, yokes, splines, joints, combinations thereof, or the like.

As noted, output gear 264 may mesh with gear 254 in one of two positions. In FIG. 2, output gear 264 meshes with gear 254 in the first position. The first position may be with the output shaft 266 vertically below an axis of the input shaft 218 by a first distance 278. The first position may thus define the short drop configuration for the output shaft 266. The short drop configuration may be utilized in applications that demand a relatively short distance between the transmission and the axles, for example in applications in which the transmission is positioned in a vertical position close to an axis of the axles.

The first, second, and third clutches as herein described may be wet friction clutches, in some examples. In other examples, the clutches may be dog clutches, dry friction clutches, or other type of clutch. Wet friction clutches may allow for a smoother transition between engagement and disengagement, as compared to dog clutches. Further, lubrication of we friction clutches may decrease degradation to the clutches over time, thereby increasing the longevity of the transmission system 200.

Turning now to FIG. 3, the transmission system 200 is again shown. Components of the transmission system 200 are unchanged compared to FIG. 2 and thus are given similar component numbering. The transmission system 200 as depicted in FIG. 3 includes the output shaft 266 in the second position, as previously noted.

In the second position, the output gear 264 may mesh with gear 254 such that the output gear 264 is vertically below the gear 254. As such, the output shaft 266 may be positioned vertically below the axis of the input shaft 218 by a second distance 370. The second distance 370 may be longer than the first distance 278 such that in the second position the axis of the output shaft 266 is further from the axis of the input shaft 218 than in the first position. In this way, the second position of the output gear 264 may be a long drop configuration of the transmission system 200. The long drop configuration may allow for the transmission system to be utilized for applications that demand a long drop between a main section of the transmission (e.g., about the axis of the input shaft) and the output. For example, loaders may demand a long drop due to the transmission being assembled/positioned higher with respect to the axles.

Inclusion of the synchronizer in the transmission system 200 herein disclosed may reduce a number of clutches, e.g., wet friction clutches, in the transmission system. Therefore, efficiency of the transmission system may be increased.

Turning now to FIGS. 4A-4C, power paths through the transmission system 200 are shown. Power paths are provided for both potential configurations of the transmission system 200, for example with the output arranged in either the short or long drop configurations described above. FIG. 4A specifically shows a power path through the transmission system 200 when in the first gear ratio, FIG. 4B specifically shows a power path through the transmission system 200 when in the second gear ratio, and FIG. 4C specifically shows a power path through the transmission system 200 when in the third gear ratio.

In the power path of the first gear ratio as depicted in FIG. 4A, power of the first and second electric motors 202, 204 is transferred into the input shaft 218 via the first and second rotor shafts 206, 208 and the first gear train 210. Specifically, power of the first electric motor 202 may be transferred from the first rotor shaft 206 into gear 212, from gear 212 to gear 214 and from gear 214 to input shaft 218. Power of the second electric motor 204 may be transferred from the second rotor shaft 208 into gear 216, from gear 216 into gear 214, and from gear 214 to input shaft 218. Power is then transferred from the input shaft 218 into the first clutch 230 via gear 258 when the first clutch 230 is engaged. From the first clutch 230, power is transferred into the first clutch gear 222 and then into the synchronizer shaft 246 via the gear 252. With the synchronizer 270 in the first position, power is transferred from the synchronizer shaft 246 to the first synchronizer gear 272 and then into the idler shaft 232 via the gear 248. From the idler shaft 232, power is transferred into gear 254 and then into the output gear 264. From the output gear 264, power is transferred to output shaft 266, to output interfaces 268, and finally to downstream components thereafter.

In the power path of the second gear ratio as depicted in FIG. 4B, power of the first and second electric motors 202, 204 is transferred into the input shaft 218 via the first and second rotor shafts 206, 208 and the first gear train 210. Specifically, power of the first electric motor 202 may be transferred from the first rotor shaft 206 into gear 212, from gear 212 to gear 214 and from gear 214 to input shaft 218. Power of the second electric motor 204 may be transferred from the second rotor shaft 208 into gear 216, from gear 216 into gear 214, and from gear 214 to input shaft 218. Power is then transferred from the input shaft 218 into the second clutch 240 via gear 258 when the second clutch 240 is engaged. When the second clutch 240 is engaged, power is transferred into the second clutch gear 234, from the second clutch gear 234 to the gear 246, and from the gear 246 to the gear 244, bypassing the synchronizer 270. From the gear 244, power is transferred into the idler shaft 232. From the idler shaft 232, power is transferred into gear 254 and then into the output gear 264. From the output gear 264, power is transferred to output shaft 266, to output interfaces 268, and finally to downstream components thereafter.

In the power path of the third gear ratio as depicted in FIG. 4C, power of the first and second electric motors 202, 204 is transferred into the input shaft 218 via the first and second rotor shafts 206, 208 and the first gear train 210. Specifically, power of the first electric motor 202 may be transferred from the first rotor shaft 206 into gear 212, from gear 212 to gear 214 and from gear 214 to input shaft 218. Power of the second electric motor 204 may be transferred from the second rotor shaft 208 into gear 216, from gear 216 into gear 214, and from gear 214 to input shaft 218. Power is then transferred from the input shaft 218 into the first clutch 230 via gear 258 when the first clutch 230 is engaged. From the first clutch 230, power is transferred into the first clutch gear 222 and then into the synchronizer shaft 246 via the gear 252. With the synchronizer 270 in the second position, power is transferred from the synchronizer shaft 246 to the second synchronizer gear 274 and then into the idler shaft 232 via the gear 250. From the idler shaft 232, power is transferred into gear 254 and then into the output gear 264. From the output gear 264, power is transferred to output shaft 266, to output interfaces 268, and finally to downstream components thereafter.

Figure 5:
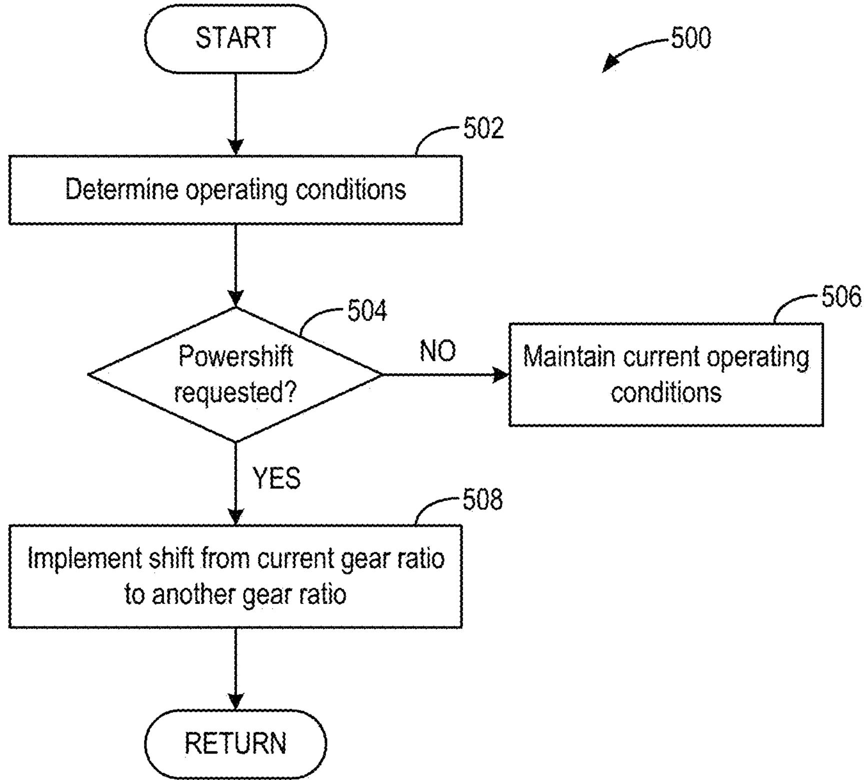
FIG. 5 shows a flowchart illustrating a method of operation of the three-speed transmission system.

Referring now to FIG. 5, a flowchart illustrating a method 500 for operation of a transmission system is shown. For example, the transmission system 200 described with respect to FIGS. 2-4C may be operated according to the method 500 as herein presented. However, the method 500 may be carried out via other suitable transmissions, in other examples. Furthermore, the method 500 may be implemented by a controller than includes a processor and memory, according to instructions stored in the memory that are executable by the processor. For example, the method 500 may be implemented by the control system 114 described with respect to FIG. 1 in response to signals received from sensors (e.g., clutch pressure sensor, speed sensors, etc.).

At 502, method 500 includes determining operating conditions. The operating conditions may include input device positions (e.g., gearshift level positions), clutch configurations(s), including which clutches are engaged and which clutches are disengaged, synchronizer position, output speed, motor speeds, motor torques, total output torque, vehicle speed, vehicle load, ambient temperature, and the like. The operating conditions may be ascertained via sensor inputs, modeling, look-up tables, and other suitable techniques.

At 504, method 500 includes judging if a powershift in the transmission should be implemented for selective shifting of one or more clutches of respective motor-transmission subassemblies of the transmission system. Such a determination may be carried out responsive to vehicle speed surpassing a threshold value, actual output torque, and/or accelerator pedal position, in some examples. In other examples, operator interaction with a gear selector and/or clutch actuator may initiate powershift operation.

If it is determined that a powershift should not occur (NO at 504), the method proceeds to 506 where the method 500 includes maintaining the current transmission operating conditions of the transmission system. For instance, the transmission system may be maintained in the first gear ratio when motor speed and vehicle speed remains below a threshold for shifting to the second or third gear ratio.

Conversely, if it is determined that a powershift should occur (YES at 504), the method 500 moves to 508 where the method 500 includes shifting the gear ratio from a current gear ratio to another gear ratio. As noted, the transmission system 200 as herein disclosed may include three gear ratios: a first gear ratio, a second gear ratio, and a third gear ratio. Determining the operating conditions at 502 may include determining current gear ratio as well as current clutch positions (e.g., engaged or disengaged). As an example, a current gear ratio may be a first gear ratio and shifting may comprise a powershift from the first gear ratio to a second gear ratio by way of disengaging the first clutch and engaging the second clutch. As another example, a current gear ratio may be the second gear ratio and shifting may comprise a powershift from the second gear ratio to the third gear ratio by way of disengaging the second clutch, engaging the first clutch, and moving the synchronizer into the second position. Powershifting may comprise shifting from one gear to another with little to no power or torque interruption.

The technical effect of the systems and methods described herein is that the transmission system, in either described configuration, may have three available gear ratios for three available speeds. The available configurations, including a short drop configuration and a long drop configuration may provide increased flexibility as the transmission may be configured for the specific intended application based on a demanded distance between the axis of the input shaft and the axis of the output shaft. Further, inclusion of an input speed reduction gear set may mitigate degradation to components of the transmission system by decreasing output speeds through the transmission.

The disclosure also provides support for a transmission system, comprising: a first electric motor coupled to an input speed reduction gear train, wherein the input speed reduction gear train rotationally couples to an input shaft, a second electric motor coupled to the input speed reduction gear train, a first clutch positioned on the input shaft, a second clutch positioned on the input shaft, a synchronizer positioned on a synchronizer shaft, wherein the synchronizer shaft is rotationally coupled to the input shaft, an idler shaft rotationally coupled to the synchronizer shaft, and an output shaft rotationally coupled to the idler shaft, wherein the output shaft is in one of a first position and a second position. In a first example of the system, the first position is a short drop configuration wherein an axis of the output shaft is a first distance from an axis of the input shaft, and the second position is a long drop configuration wherein the axis of the output shaft is a second, further distance from the axis of the input shaft. In a second example of the system, optionally including the first example, the input speed reduction gear train comprises a first gear, a second gear, and a third gear coupled in series, wherein the first gear couples to the first electric motor, the second gear rotationally couples to the input shaft, and the third gear couples to the second electric motor. In a third example of the system, optionally including one or both of the first and second examples, the input shaft is selectively rotationally coupled to the synchronizer shaft via a first clutch gear of the first clutch when the first clutch is engaged and wherein: the synchronizer shaft is selectively rotationally coupled to the idler shaft via a first synchronizer gear when the synchronizer is in a first position, and the synchronizer shaft is selectively rotationally coupled to the idler shaft via a second synchronizer gear when the synchronizer is in a second position. In a fourth example of the system, optionally including one or more or each of the first through third examples, the input shaft is selectively rotationally coupled to the idler shaft via a gear train comprising a second clutch gear of the second clutch, a first gear arranged on the synchronizer shaft, and a second gear arranged on the idler shaft. In a fifth example of the system, optionally including one or more or each of the first through fourth examples, the first clutch and the second clutch are configured together as a multi-range clutch, wherein, in a first position of the multi-range clutch, the first clutch is engaged, and in a second position of the multi-range clutch, the second clutch is engaged. In a sixth example of the system, optionally including one or more or each of the first through fifth examples when the first clutch is engaged, the second clutch is disengaged, and the synchronizer is in a first position, the transmission system is in a first gear ratio, when the second clutch is engaged and the first clutch is engaged, the transmission system is in a second position, and when the first clutch is engaged, the second clutch is disengaged, and the synchronizer is in a second position, the transmission system is in a third gear ratio.

The disclosure also provides support for a multi-speed transmission, comprising: an input shaft coupled to a first electric motor and a second electric motor via a first gear train, a synchronizer shaft selectively coupled to the input shaft via one of a fifth gear train and a third gear train depending on a selected gear ratio, an idler shaft selectively coupled to the synchronizer shaft via one of the third gear train, a fourth gear train, and the fifth gear train depending on the selected gear ratio, and an output shaft coupled to the idler shaft via a sixth gear train in one of a short drop configuration and a long drop configuration, wherein a multi-range clutch, including a first clutch and a second clutch, is positioned on the input shaft and a synchronizer is positioned on the synchronizer shaft. In a first example of the system, the first gear train comprises a first gear meshed with a second gear, which also meshes with a third gear, wherein the first gear is rotationally coupled to a first rotor shaft of the first electric motor, the second gear is rotationally coupled to the input shaft, and the third gear rotationally couples to a second rotor shaft of the second electric motor. In a second example of the system, optionally including the first example, a second gear train comprises a first clutch gear of the first clutch of the multi-range clutch meshed with a gear that is rotationally coupled to the synchronizer shaft. In a third example of the system, optionally including one or both of the first and second examples, the fifth gear train comprises a second clutch gear of the second clutch of the multi-range clutch meshed with a first gear that is rotationally coupled to the synchronizer shaft and is meshed with a second gear that is rotationally coupled to the idler shaft. In a fourth example of the system, optionally including one or more or each of the first through third examples, the third gear train comprises a first synchronizer gear of the synchronizer meshed with a first gear that is rotationally coupled to the idler shaft and the fourth gear train comprise a second synchronizer gear of the synchronizer meshed with a second gear that is rotationally coupled to the idler shaft. In a fifth example of the system, optionally including one or more or each of the first through fourth examples, the sixth gear train comprises a first gear rotationally coupled to the idler shaft meshed with a second gear fixedly rotationally coupled to the output shaft. In a sixth example of the system, optionally including one or more or each of the first through fifth examples in the short drop configuration, an axis of the output shaft is a first distance from an axis of the input shaft and, in the long drop configuration, the axis of the output shaft is a second, further distance from the axis of the input shaft. In a seventh example of the system, optionally including one or more or each of the first through sixth examples: in a first gear ratio, the input shaft is selectively rotationally coupled to the synchronizer shaft via a second gear train and the synchronizer shaft is rotationally coupled to the idler shaft via the third gear train, in a second gear ratio, the input shaft is selectively rotationally coupled to the synchronizer shaft and the idler shaft via the fifth gear train, and in a third gear ratio, the input shaft is selectively rotationally coupled to the synchronizer shaft via the second gear train and the synchronizer shaft is rotationally couple to the idler shaft via the fourth gear train.

The disclosure also provides support for an electric drive unit, comprising: a transmission system comprising: an input shaft, a synchronizer shaft, an idler shaft, a first clutch arranged on the input shaft and configured to selectively couple the input shaft to the synchronizer shaft in one or more of first and third gear ratios, a second clutch arranged on the input shaft and configured to selectively couple the input shaft to the idler shaft in a second gear ratio, a synchronizer configured to selectively couple the synchronizer shaft to the idler shaft in one of the first and third gear ratios based on a position of the synchronizer when the first clutch is engaged, and an output shaft coupled to the idler shaft, wherein the output shaft is positioned in one of a first and second position relative to the input shaft, and one or more electric motors, wherein each of the one or more electric motors is coupled to the input shaft of the transmission system. In a first example of the system, the first and second clutches are configured as a multi-range clutch, wherein both the first and second clutches are rotationally coupled to the input shaft via the same gear. In a second example of the system, optionally including the first example, the synchronizer comprises a selector, a first synchronizer gear, and a second synchronizer gear, wherein the selector is configured to enable movement of the synchronizer between a first position and a second position, wherein: in a first position, the first synchronizer gear is rotationally coupled to the idler shaft, and in a second position, the second synchronizer gear is rotationally coupled to the idler shaft. In a third example of the system, optionally including one or both of the first and second examples, in the first gear ratio, the first clutch is engaged and the synchronizer is in the first position, and in the third gear ratio, the first clutch is engaged and the synchronizer is in the second position. In a fourth example of the system, optionally including one or more or each of the first through third examples, in the second gear ratio, the first clutch is disengaged and the second clutch is engaged to couple the input shaft to the idler shaft, bypassing the synchronizer.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A transmission system, comprising:

a first electric motor coupled to an input speed reduction gear train, wherein the input speed reduction gear train rotationally couples to an input shaft;

a second electric motor coupled to the input speed reduction gear train;

a first clutch positioned on the input shaft;

a second clutch positioned on the input shaft;

a synchronizer positioned on a synchronizer shaft, wherein the synchronizer shaft is rotationally coupled to the input shaft;

an idler shaft rotationally coupled to the synchronizer shaft; and an output shaft rotationally coupled to the idler shaft;

wherein in a selected gear ratio the synchronizer is in a neutral position, the first clutch is disengaged, and the second clutch is engaged such that power flows from a second clutch gear to a synchronizer shaft gear that is arranged on the synchronizer shaft, from the synchronizer shaft gear to an idler shaft gear that is arranged on the idler shaft, and from the idler shaft gear to the output gear that is arranged on the output shaft.

2. The transmission system of claim 1, wherein the synchronizer shaft is positioned between the input shaft and the idler shaft along a perpendicular axis that extends through the synchronizer shaft, the input shaft, and the idler.

3. The transmission system of claim 1, wherein the input speed reduction gear train comprises a first gear, a second gear, and a third gear coupled in series, wherein the first gear couples to the first electric motor, the second gear rotationally couples to the input shaft, and the third gear couples to the second electric motor.

4. The transmission system of claim 1, wherein the input shaft is selectively rotationally coupled to the synchronizer shaft via a first clutch gear of the first clutch when the first clutch is engaged and wherein:

the synchronizer shaft is selectively rotationally coupled to the idler shaft via a first synchronizer gear when the synchronizer is in a first position; and the synchronizer shaft is selectively rotationally coupled to the idler shaft via a second synchronizer gear when the synchronizer is in a second position.

5. The transmission system of claim 1, wherein the input shaft is selectively rotationally coupled to the idler shaft via a gear train comprising a second clutch gear of the second clutch, a first gear arranged on the synchronizer shaft, and a second gear arranged on the idler shaft.

6. The transmission system of claim 1, wherein the first clutch and the second clutch are configured together as a multi-range clutch, wherein, in a first position of the multi-range clutch, the first clutch is engaged, and in a second position of the multi-range clutch, the second clutch is engaged.

7. The transmission system of claim 1, wherein the transmission system includes solely three operating gears.

8. A multi-speed transmission, comprising:

an input shaft coupled to a first electric motor and a second electric motor via a first gear train;

a synchronizer shaft selectively coupled to the input shaft via one of a second gear train and a third gear train depending on a selected gear ratio;

an idler shaft selectively coupled to the synchronizer shaft via one of a fourth gear train and the fifth gear train depending on the selected gear ratio; and an output shaft coupled to the idler shaft via a sixth gear train in one of a short drop configuration and a long drop configuration, wherein a multi-range clutch, including a first clutch and a second clutch, is positioned on the input shaft and a synchronizer is positioned on the synchronizer shaft;

wherein in a first selected gear ratio the synchronizer is in a neutral position, the first clutch is disengaged, and the second clutch is engaged such that power flows from a second clutch gear to a synchronizer shaft gear that is arranged on the synchronizer shaft, from the synchronizer shaft gear to an idler shaft gear that is arranged on the idler shaft, and from the idler shaft gear to the output gear that is arranged on the output shaft; and wherein in a second selected gear ratio the synchronizer is engaged with the fourth gear train, the first clutch is engaged with the first gear train, and the second clutch is neutral such that power flows from the input shaft to the first clutch, from the first clutch to the synchronizer shaft, from the synchronizer shaft to the synchronizer, and from the synchronizer to the idler shaft.

9. The multi-speed transmission of claim 8, wherein the first gear train comprises a first gear meshed with a second gear, which also meshes with a third gear, wherein the first gear is rotationally coupled to a first rotor shaft of the first electric motor, the second gear is rotationally coupled to the input shaft, and the third gear rotationally couples to a second rotor shaft of the second electric motor.

10. The multi-speed transmission of claim 8, wherein a second gear train comprises a first clutch gear of the first clutch of the multi-range clutch meshed with a gear that is rotationally coupled to the synchronizer shaft.

11. The multi-speed transmission of claim 8, wherein the fifth gear train comprises a second clutch gear of the second clutch of the multi-range clutch meshed with a first gear that is rotationally coupled to the synchronizer shaft and is meshed with a second gear that is rotationally coupled to the idler shaft.

12. The multi-speed transmission of claim 8, wherein the third gear train comprises a first synchronizer gear of the synchronizer meshed with a first gear that is rotationally coupled to the idler shaft and the fourth gear train comprise a second synchronizer gear of the synchronizer meshed with a second gear that is rotationally coupled to the idler shaft.

13. The multi-speed transmission of claim 8, wherein the sixth gear train comprises a first gear rotationally coupled to the idler shaft meshed with a second gear fixedly rotationally coupled to the output shaft.

14. The multi-speed transmission of claim 8, wherein, in the short drop configuration, an axis of the output shaft is a first distance from an axis of the input shaft and, in the long drop configuration, the axis of the output shaft is a second, further distance from the axis of the input shaft.

15. The multi-speed transmission of claim 8, wherein:

in a first gear ratio, the input shaft is selectively rotationally coupled to the synchronizer shaft via a second gear train and the synchronizer shaft is rotationally coupled to the idler shaft via the third gear train;

in a second gear ratio, the input shaft is selectively rotationally coupled to the synchronizer shaft and the idler shaft via the fifth gear train; and in a third gear ratio, the input shaft is selectively rotationally coupled to the synchronizer shaft via the second gear train and the synchronizer shaft is rotationally couple to the idler shaft via the fourth gear train.

16. An electric drive unit, comprising:

a transmission system comprising:

an input shaft;

a synchronizer shaft;

an idler shaft;

a first clutch arranged on the input shaft and configured to selectively couple the input shaft to the synchronizer shaft in one or more of first and third gear ratios;

a second clutch arranged on the input shaft and configured to selectively couple the input shaft to the idler shaft in a second gear ratio;

a synchronizer configured to selectively couple the synchronizer shaft to the idler shaft in one of the first and third gear ratios based on a position of the synchronizer when the first clutch is engaged; and an output shaft coupled to the idler shaft, wherein the output shaft is positioned in one of a first and second position relative to the input shaft; and one or more electric motors, wherein each of the one or more electric motors is coupled to the input shaft of the transmission system;

wherein in a first selected gear ratio the synchronizer is in a neutral position, the first clutch is disengaged, and the second clutch is engaged such that power flows from a second clutch gear to a synchronizer shaft gear that is arranged on the synchronizer shaft, from the synchronizer shaft gear to an idler shaft gear that is arranged on the idler shaft, and from the idler shaft gear to the output gear that is arranged on the output shaft;

wherein in a second selected gear ratio the synchronizer is engaged with the fourth gear train, the first clutch is engaged with the first gear train, and the second clutch is neutral such that power flows from the input shaft to the first clutch, from the first clutch to the synchronizer shaft, from the synchronizer shaft to the synchronizer, and from the synchronizer to the idler shaft; and wherein in a third selected gear ratio the synchronizer is engaged with the fifth gear train, the first clutch is disengaged, and the second clutch is engaged with the second gear train such that power flows from the input shaft to the second clutch, from the second clutch to the synchronizer shaft, from the synchronizer shaft to the synchronizer, and from the synchronizer to the idler shaft.

17. The electric drive unit of claim 16, wherein the first and second clutches are configured as a multi-range clutch.

18. The electric drive unit of claim 16, wherein the synchronizer comprises a selector configured to enable movement of the synchronizer between a first position and a second position, wherein:

in a first position, the first synchronizer gear is rotationally coupled to the synchronizer shaft; and in a second position, the second synchronizer gear is rotationally coupled to the synchronizer shaft.

19. The electric drive unit of claim 18, wherein in the first gear ratio, the first clutch is engaged and the synchronizer is in the first position, and in the third gear ratio, the first clutch is engaged and the synchronizer is in the second position.

20. The electric drive unit of claim 18, wherein in the second gear ratio, the first clutch is disengaged and the second clutch is engaged to couple the input shaft to the idler shaft, bypassing the synchronizer.

* * * * *